United States Patent [19]

Rose

[11] 3,733,436

[45] May 15, 1973

[54] VIEWING SHIELD FOR DISPLAY DEVICE

[76] Inventor: Joseph K. Rose, 1958 Linden Avenue, Highland Park, Ill. 60035

[22] Filed: Mar. 24, 1972

[21] Appl. No.: 237,652

[52] U.S. Cl. ........................178/7.82, 353/75, 353/97

[51] Int. Cl. ..............................................H04n 5/64

[58] Field of Search...........................353/74, 75, 97; 178/7.82, 7.9

[56] References Cited

UNITED STATES PATENTS 2,598,072 5/1952 Rose....................................178/7.82

3,462,852 8/1969 Emerson ............................178/7.82

*Primary Examiner*—Robert L. Griffin

*Assistant Examiner*—Joseph A. Orsino, Jr.

*Attorney*—James B. Kinzer et al.

[57] ABSTRACT

A four-sided light shield assembly for a television receiver or other image-exhibiting apparatus, in which the side panels have a hinged construction allowing the assembly to be folded to flat, compact form without detachment or separation of any of the components, when the shield assembly is removed from the image-exhibiting apparatus, but with the side panels locked against folding when the shield assembly is opened up for use.

10 Claims, 13 Drawing Figures

VIEWING SHIELD FOR DISPLAY DEVICE

BACKGROUND OF THE INVENTION

There are a number of different kinds of image-exhibiting apparatus that produce images of limited brightness suitable for viewing only under relatively restricted ambient lighting conditions. Perhaps the most familiar example is a television receiver; the conventional television picture tube produces an image that is sharp and clearly defined only when the ambient lighting is relatively limited. Moving the television receiver to an outdoor location on even a relatively dull day, however, makes for extremely difficult viewing because the contrast between the image and the surrounding environment is quite inadequate. The same situation prevails indoors on a bright day, particularly in a room with a substantial expanse of windows.

Other examples of image-exhibiting apparatus that have the same basic disadvantage when employed in conditions entailing relatively high ambient lighting include slide viewers and oscilloscopes. Throughout this specification and in the appended claims, the term "image-exhibiting apparatus" refers to equipment of this general nature, and particularly to any form of back-lighted image display equipment. The term "image display member" refers to a cathode ray picture tube, back-lighted display screen, or similar device used to produce visual images in such apparatus.

A number of proposals have been advanced to improve the usability of television receivers and other image-exhibiting apparatus under conditions of high ambient lighting. The most practical technique is to provide a light shield projecting outwardly of the image display member, toward the viewer, to reduce the amount of light impinging upon the image from external sources. In several instances, it has been proposed that the light shield be mounted directly upon and constitute a part of the cabinet of the image-exhibiting apparatus. Two excellent examples of this kind of light shield are described and claimed in patents of Joseph K. Rose, U.S. Pat. No. 3,062,917, issued Nov. 6, 1962 and U.S. Pat. No. 3,087,014, issued Apr. 23, 1963.

The difficulty with built-in light shields of the kind described in the aforementioned Rose patents is that they require substantial modification or even complete redesign of the housing of the television receiver or other image-exhibiting apparatus. For equipment that may never be required to operate under high ambient lighting, the additional cost increment is not really justified. To meet this contingency, it has been proposed to provide a detachable light shield that can be removably mounted upon an image display cabinet of generally conventional construction. A number of rather simple forms of detachable light shield have been proposed; perhaps the best detachable construction is that described and claimed in Rose U.S. Pat. No. 3,329,771, issued July 4, 1967. The light shields shown in the latter patent are, for the most part, three-sided shields that can be removed from the television receiver or other display equipment and folded for storage or transportation when not needed. The three-sided construction, however, does not provide optimum viewing results, since it inevitably allows some ambient light to reach the image screen from around the bottom of the light shield.

There is a definite need, therefore, for a complete demountable shield that covers all sides of a television picture tube or other image display member. The shield should be of inexpensive construction and should be capable of being folded to a flat, compact configuration when not in use, to provide for efficient storage and for convenient transportation. On the other hand, many users will not tolerate more than minimal assembly effort in the use of a shield; consequently, the shield should be of unitary construction and should require little or no assembly action, so that it can be used on short notice and under widely varying circumstances.

SUMMARY OF THE INVENTION

It is a principal object of the invention, therefore, to provide a new and improved viewing shield for a television receiver, slide viewer, oscilloscope, or like image-exhibiting apparatus, that completely encompasses the image display member of the apparatus and that can be expanded from a flat, compact storage condition to an open shielding condition simply by pushing the sides of the shield outwardly of each other.

An additional object of the invention is to provide a new and improved four-sided foldable viewing shield for a television receiver or other similar image-exhibiting apparatus which, when opened to its shielding condition, is inherently and effectively locked against any tendency toward reversion to its folded storage condition.

A specific object of the invention is to provide a new and improved mounting arrangement for mounting a foldable viewing shield on the image display member of a television receiver or like image-exhibiting apparatus, in which the mounting elements of the shield also serve to hold the shield in open shielding condition when mounted upon the image-exhibiting apparatus.

A particular object of the invention is to provide a new and improved four-sided foldable viewing shield for a television receiver or like image-exhibiting apparatus that is simple and inexpensive in construction, and that requires minimal effort for transition from open to closed condition, or vice versa, yet which is rugged and enduring in use.

Accordingly, the invention relates to a viewing shield for a television receiver, slide viewer, oscilloscope, or other image-exhibiting apparatus of the kind comprising an image display member disposed within an encompassing frame. The shield comprises four shield panels hingedly connected to each other along adjacent edges in a closed sequence to form a unitary shield assembly, the four shield panels including a top panel and a bottom panel joined by two opposed side panels. Each side panel includes an upper panel element and a lower panel element joined together by a transverse hinge that extends the full length of the side panel from a back edge to a front edge. The shield assembly has two operating conditions. The first is an open condition, in which the upper and lower elements of each side panel are disposed in co-planar relation and the back edges of all panels correspond approximately to the configuration of the image display member frame. The second is a closed condition in which the upper and lower elements of each side panel are folded flat against each other and the entire assembly is folded in a flat, compact alignment for storage or transportation. The shield assembly further comprises means for holding the upper and lower panel elements of each side panel in co-planar relation when the assembly is in its open condition, and releasable means for mounting the assembly, in its open condition, on the image display member frame.

DESCRIPTION OF THE PREFERRED EMBODIMENTS

Figure 1:
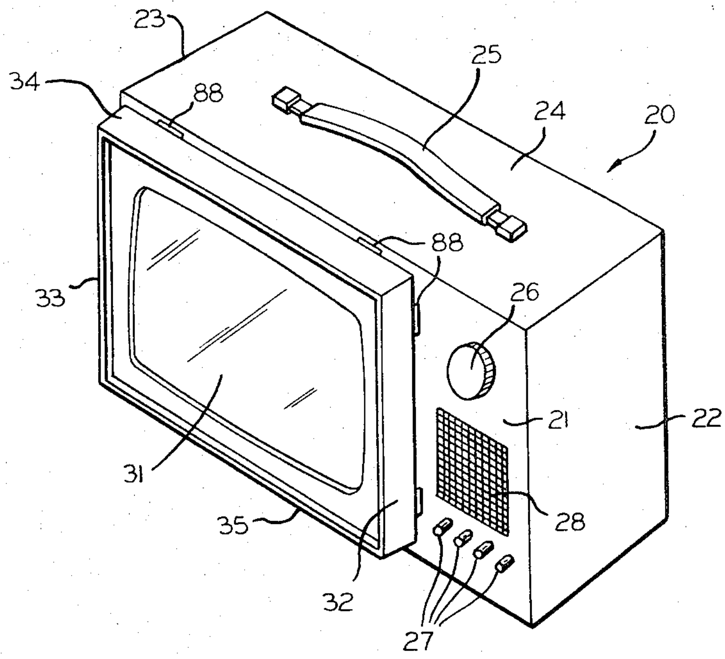
FIG. 1 is a perspective view of a portable television receiver on which a viewing shield constructed in accordance with the present invention may be utilized.

FIG. 1 illustrates a typical small television receiver 20 with which the viewing shield of the present invention may be employed. The cabinet of receiver 20 is usually formed of molded plastic and includes a front wall 21, side walls 22 and 23, and a top wall 24. Most small television receivers, usually referred to as portable receivers, are provided with a carrying handle such as the handle 25.

The front wall 21 of television receiver 20 is equipped with the usual controls, including a channel selector 26 and several other control elements 27. A speaker grill 28 may be located in the front wall 21 of the receiver cabinet; in some instances, the speaker grill will be positioned on the side wall 22 or elsewhere on the cabinet. For television receiver 20, the image is formed on the screen of a cathode ray picture tube 31, sometimes referred to hereinafter as the image display device. The image screen of device 31 is surrounded by an image frame, usually formed of molded plastic, comprising side walls 32 and 33, a top wall 34, and a bottom wall 35, which frame may be an integral part of the front cabinet wall 21. The image frame 32–35 usually projects outwardly of the front wall 21 of the receiver by a short distance, of the order of one-half to 1 inch. In conventional construction, the four image frame walls 33–35 are of truncated pyramidal configuration with the large base of the pyramid at the juncture of the frame walls and the front cabinet wall 21 and the small base at the outer rim of the frame. This configuration is ordinarily employed because the slope of the frame walls facilitates the molding operation by which the frame is manufactured, making the frame easier to remove from its mold.

Figure 2:
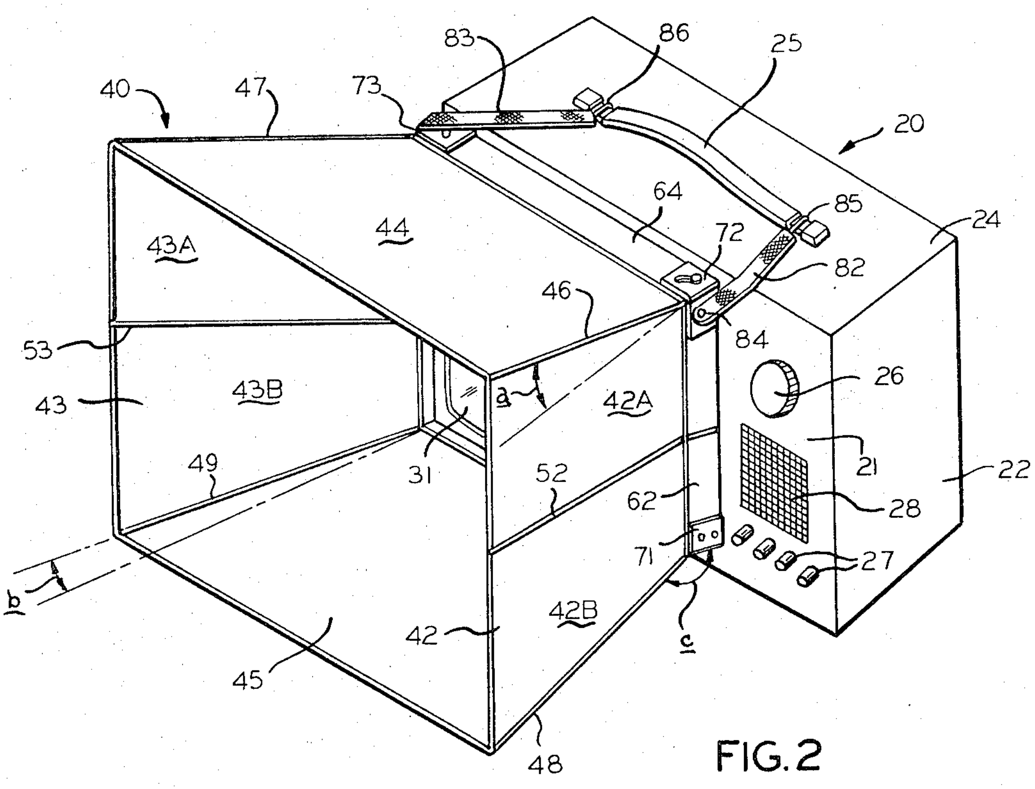
FIG. 2 is a perspective view showing a viewing shield, constructed in accordance with the present invention, mounted on the television receiver of FIG. 1.

FIG. 2 affords a general illustration of a viewing shield 40, constructed in accordance with the present invention, mounted upon the television receiver 20 in position of use. The viewing shield 40 includes four shield panels comprising a top panel 44, a bottom panel 45, and two similar side panels 42 and 43. The first side panel 42 is connected along its top edge to one side edge of the top panel 44 by an elongated hinge 46. The other side of the top panel 44 is connected, by a similar hinge 47, to the upper edge of the side panel 43. The bottom panel 45 is hingedly connected to the side panels 42 and 43 by two elongated hinges 48 and 49, respectively. It is thus seen that the four shield panels 42–45 are all hingedly connected to each other along adjacent edges in a closed sequence to form the unitary four-sided shield assembly 40.

The first side panel 42 is formed of an upper panel element 42A and a lower panel element 42B joined together by a transverse hinge 52 that extends the full length of the side panel 42. Thus, hinge 52 extends from the back edge of the panel, adjacent receiver 20, to the front edge of the panel. Similarly, side panel 43 comprises an upper panel element 43A and a lower panel element 43B. The two panel elements 43A and 43B are joined together by a transverse hinge 53 that extends the full length of the side panel 43 from the back edge of the side panel to its front edge. In the open condition of viewing shield 40, as illustrated in FIG. 2, the two panel elements of each side panel are disposed in co-planar relation. That is, elements 42A and 42B of side panel 42 are aligned in co-planar relation to each other and the same is true of the elements 43A and 43B of side panel 43.

Figures 6, 7, 8, 9:
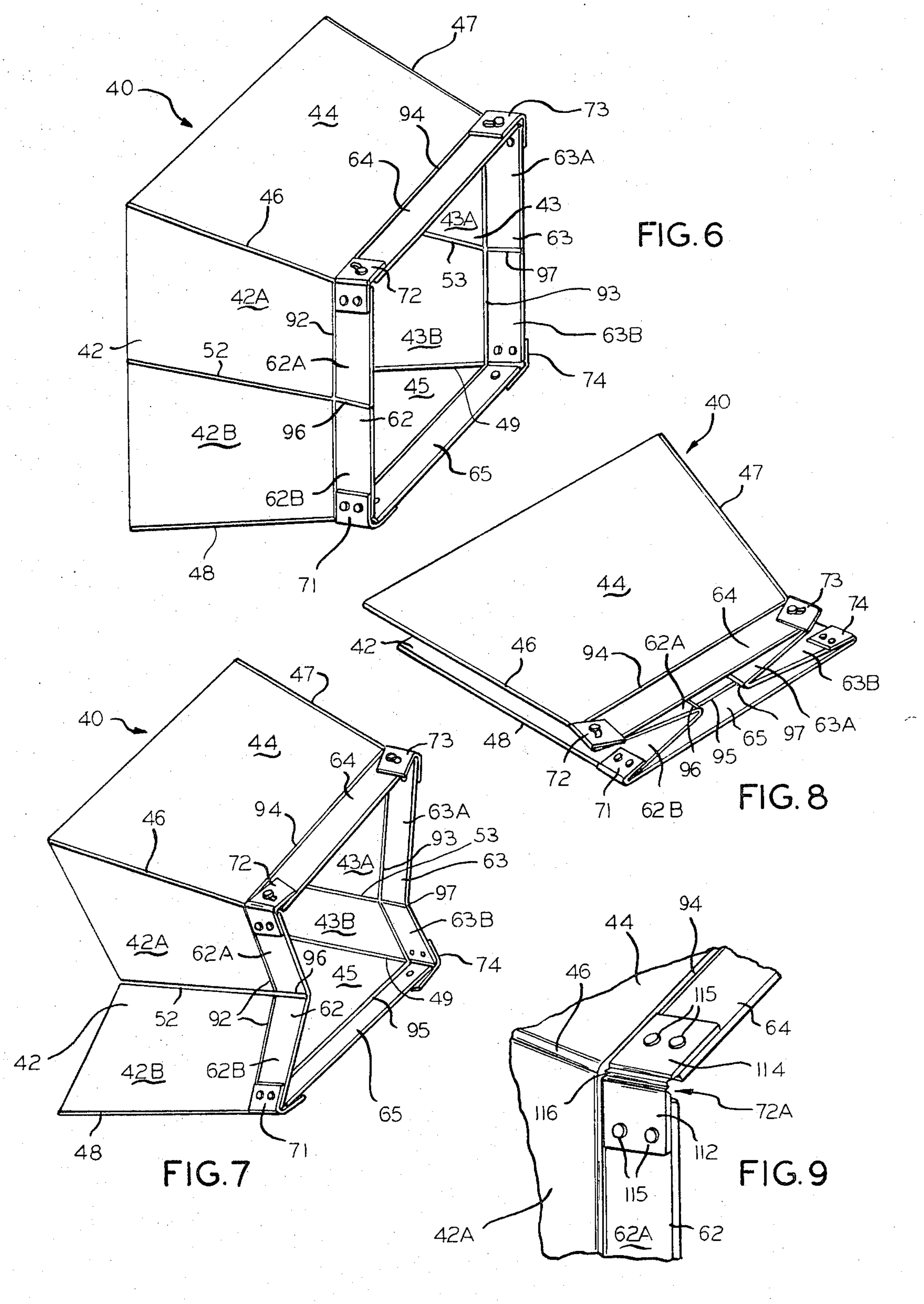
FIG. 6 is a perspective view illustrating the viewing shield in open condition, ready for mounting on a television receiver.
FIG. 7 is a perspective view illustrating an initial stage in folding of the viewing shield.
FIG. 8 illustrates the viewing shield in its folded or closed position.
FIG. 9 is a detail perspective view, like FIG. 4A, showing a different hinge construction.

Viewing shield 40 further comprises four mounting flange members hingedly mounted on the back edges of the panels that form the viewing shield. Thus, a side mounting flange 62 is hingedly connected to the rear edge of side panel 42 and a top mounting flange 64 is hingedly connected to the rear edge of the top panel 44. A side mounting flange 63 is hingedly connected to the rear edge of side panel 43 and a bottom mounting flange 65 is hingedly connected to the rear edge of bottom panel 45, as shown in FIG. 6. The mounting flanges 62, 63, 64 and 65 of viewing shield 40 conform to the configuration of the frame walls 32, 33, 34 and 35 of the television receiver (FIG. 1) to afford a complete, light-tight enclosure surrounding the image screen of display member 31. The ends of the four flanges 62, 63, 64 and 65 are connected by hinges 71, 72, 73 and 74, as shown in FIGS. 2 and 6.

When viewing shield 40 is mounted in its open condition on the cabinet of an image reproducing apparatus, such as the television receiver 20 (FIG. 2), it fully surrounds the viewing screen of the apparatus. The top panel 44 of shield 40 is usually positioned at an upward angle *a*, relative to a horizontal line perpendicular to image display device 31, of approximately 20° to 25°. Each of the side panels 42 and 43 is positioned at an angle *b* of about 10° to 15° outwardly of a line originating at the corner of the image frame and extending perpendicular to the image display device 31. The bottom panel 45 of shield 40 may extend approximately horizontally or may be at a small angle upwardly relative to the horizontal. As shown in FIG. 2, the panels 42–45 of viewing shield 40 form a truncated pyramid with the small base of the pyramid surrounding the image frame around display device 31 and the large base of the pyramid at the outer edges of the panels when the shield is in its open shielding condition mounted on television receiver 20.

When the viewing shield 40 is mounted on the television receiver 20 (FIG. 2), the shield panels 42–45 provide satisfactory viewing of the image on display device 31 under high ambient lighting conditions. The viewing shield excludes interferring external light from the image screen of display device 31 while maintaining a suitable angle of vision relative to the viewing screen of the image display device. The inner surfaces of the outwardly flared panels afford a surround area encompassing the display device 31. This surround area masks the portion of the cabinet of the television receiver or other image exhibiting apparatus adjacent to the display device 31. Preferably, the inner surfaces of the shield panels 42–45 are provided with a light diffusing color-neutral finish having a low reflection factor. This provides a darkened area in front of and around the image screen of the display device 31, allowing comfortable sustained viewing under extreme conditions of high external light, such as may be encountered outdoors or even indoors in bright daylight.

In the open condition of viewing shield 40, (FIG. 2), each of the flange members 62–65 fits onto one of the frame surfaces 32–35 of the image exhibiting apparatus 20 (see FIG. 1). Moreover, each of the flanges 62–65 engages the corresponding frame surface at the same angle as that frame surface projects outwardly from the front wall 21 of the television receiver cabinet. It is important that there be no light entry to the interior of viewing shield 40, at the point of attachment of the shield to the image-exhibiting apparatus. The mounting flanges of viewing shield 40 meet this requirement, forming an exactly fitting and light-tight attachment to the image frame 32–35 of the image-exhibiting apparatus 20.

The viewing shield 40 should be securely mounted on the cabinet of the image-exhibiting apparatus 20. This can be accomplished in a number of ways. For example, a pair of elastic straps 82 and 83 can be affixed to the upper ends of the two side mounting flanges 62 and 63 by rivets or other suitable means as exemplified by rivet 84 for strap 82 in FIG. 2. The straps 82 and 83 terminate in hooks 85 and 86 which engage the opposite ends of handle 25 to hold the viewing shield tightly against the front of the television receiver cabinet. Alternatively, hooks 85 and 86 may be engaged with the back edge of the cabinet top 24 or may be attached at other points on the cabinet.

Figures 3, 4, 5, 5A:
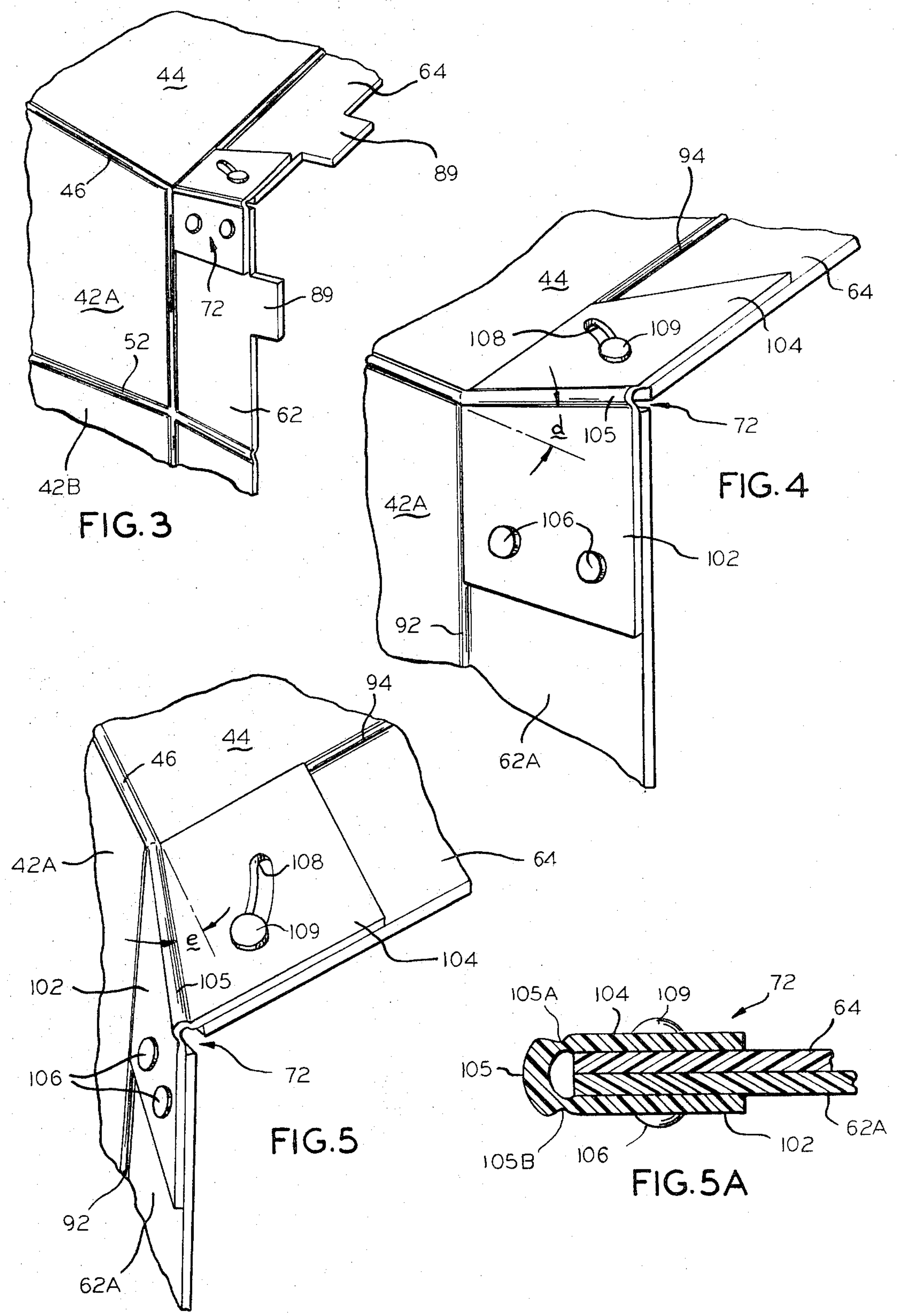
FIG. 3 is a detail perspective view, drawn to an enlarged scale, illustrating one form of mounting arrangement that may be used for the viewing shield of FIG. 2.
FIG. 4 is a detail perspective view of one form of corner hinge construction that may be utilized in the viewing shield of FIG. 1, with the hinge open.
FIG. 5 is a detail perspective view, similar to FIG. 4 but drawn from a different vieWpoint.
FIG. 5A is a detail sectional view of the hinge of FIGS. 4 and 5, with the hinge closed.

Another mounting technique for light shield 40, entailing a minor modification in the cabinet for the image exhibiting apparatus 20, is illustrated in FIGS. 1 and 3. Thus, the front wall 21 of the cabinet may be provided with a series of slots 88 in the front wall 21 of the cabinet, around the edge of the image frame surrounding the display device 31. With this arrangement, the mounting flanges of the viewing shield are provided with a series of tabs 89, as illustrated in FIG. 3, the tabs 89 being positioned and sized to fit into the slots 88 in the front wall of the cabinet. The cabinet may be provided with holding means, within the slots 88, such as individual retainer springs, or a spring-held wall, exerting a sufficient force on the tabs 89 to hold the light shield 40 in position of use on the front of the image-exhibiting apparatus 20.

A third technique for mounting light shield 40 on the cabinet of television receiver 20 entails the provision of a series of spring clamps on the front of the television receiver around the image frame 32–35. The flanges 62–65 of the viewing shield are engaged by these spring clamps to mount the viewing shield on the television receiver in the desired position of use. A spring clamp retainer construction of this kind is illustrated in FIGS. 16 and 17 of Rose U.S. Pat. No. 3,329,771, and hence has not been shown in the drawings of the present application.

When the viewing shield 40 is mounted on the image exhibiting apparatus 20, as shown in FIG. 2, the side mounting flange 62 is disposed at a distinct angle *c* with respect to the side panel 42. The same relationship applies to the other side panel 43 and its mounting flange 63 (FIG. 5). As long as this relationship is maintained, with the mounting flanges of the side panels substantially displaced from a coplanar relationship with the side panels, the side panels cannot be folded along their hinges 52 and 53. Stated differently, by maintaining each of the mounting flanges 62 and 63 in a non-coplanar relationship with the related side panel 42 or 43, the viewing shield 40 is inherently and effectively locked in its open condition and cannot be folded to the storage condition described more fully hereinafter.

The requisite non-coplanar relationship between the side panels and the side mounting flanges of the viewing shield 40 is maintained even if the external walls 32 and 33 of the image frame (FIG. 1) are parallel to each other and perpendicular to the front wall 21 of the image-exhibiting apparatus cabinet. That is, the angle *c* (FIG. 2) is not increased to 180°, even if the flange 62 is perpendicular to wall 21 (FIG. 2), because of the outward flaring angle *b* for each of the side panels 42 and 43. In the unlikely event that the walls 32 and 33 of the image frame (FIG. 1) converge inwardly toward the front cabinet wall 21, appropriate shimming wedges can be cemented or otherwise mounted on the image frame walls to assure maintenance of an appreciable angle *c* between the side flanges and side panels when the viewing shield is mounted in its open condition on an image-exhibiting apparatus.

The preferred construction for viewing shield 40 is illustrated in greater detail in FIGS. 4–8. As shown in FIGS. 6–8, the side mounting flange 62 is attached to side panel 42 by means of an elongated hinge 92 running the entire height of the side panel and flange. A similar hinge 93 connects the other side mounting flange 63 to the side panel 43. A hinge 94 extending the entire width of the top panel 44 joins the top panel to the top mounting flange 64. A corresponding hinge 95 connects the bottom mounting flange 65 to the back edge of the bottom shield panel 45.

The side mounting flange 62, like the side panel 42, is constructed in two segments. Thus, flange 62 comprises an upper flange element 62A that is connected to the upper panel element 42A by the hinge 92 and a lower flange element 62B that is connected by the hinge 92 to the lower panel element 42B. A hinge 96 interconnects the upper and lower flange elements 62A and 62B, the hinge 96 being aligned with the hinge 52 between the panel elements 42A and 42B. A corresponding construction is used on the opposite side of the shield assembly, flange 63 comprising two flange elements 63A and 63B interconnected by a transverse hinge 97 that is aligned with the hinge 53 between the side panel elements 43A and 43B.

The viewing shield assembly 40 has two basic conditions, an open viewing condition shown in FIGS. 2 and 6, and a folded closed condition illustrated in FIG. 8; the closed condition is particularly suited for storage or transportation of the viewing shield. In the open condition of viewing shield 40 (FIGS. 2 and 6), flange members 62 and 64 must be held by corner hinge 72 at the proper angle for mounting to the image frame of the television receiver or other image-exhibiting apparatus. In the closed condition of the viewing shield (FIG. 8), on the other hand, flange 64 must be coplanar with top shield panel 44 and the upper and lower elements 62A and 63A of the side mounting flange 62 must be coplanar with their attached side panel elements 42A and 42B. This changes the angular relationship between the adjacent ends of flanges 62 and 64 and requires a repositioning of the corner hinge 72. The same situation applies with respect to hinges 71, 73 and 74.

The construction of hinge 72 is shown in substantial detail in FIGS. 4, 5 and 5A. Hinge 72 comprises a first hinge leaf 102 connected to a second hinge leaf 104 by a pivot member 105. In the construction illustrated in FIGS. 4–5A, pivot member 105 and hinge leaves 102 and 104 are formed from a unitary segment of relatively rigid plastic stock that has been processed to afford parallel linear elements 105A and 105B of reduced thickness that afford the requisite flexibility to allow folding of the hinge leaves to rotate between closed condition shown in FIG. 5A and the open condition illustrated in FIGS. 4 and 5. Although a unitary plastic construction is illustrated, it should be understood that a conventional hinge pin and pin retainers can be utilized in hinge 72, instead of pivot member 105, if desired.

Leaf 102 of hinge 72 is rigidly affixed to the upper edge of flange element 62A by suitable means such as a pair of rivets 106. Leaf 104, on the other hand, is attached to the adjacent end of panel 64 by means of a shoulder rivet 109 mounted on flange 64, with the shaft of the rivet extending through an arcuate slot 108 in hinge leaf 104 (FIGS. 4 and 5). The shoulder rivet or pin 109 affords a controlled, sliding attachment between hinge leaf 104 and flange 64. This permits rotation of hinge leaf 104 on flange 64. This permits rotation of hinge leaf 104 about the axis of the arcuate slot 108, which coincides approximately with the inner end of hinge element 105, hinge leaf 104 being held flat against flange 64 in the range of travel established by the arcuate slot 108.

Referring to FIG. 4, hinge leaf 102 has a configuration such that in the opened-out position of viewing shield 40, the top mounting flange 64 extends upwardly, relative to the edge of the top shield panel 44, at an angle *d*. As shown in FIG. 5, the configuration of hinge leaf 104 and its connection to flange 64 is such that, with the viewing shield in its open condition, the side flange element 62A extends outwardly at an angle *e* from side panel element 42A. This is one end of the range of movement for hinge leaf 104, corresponding to the open condition of the viewing shield. The same type of corner hinge construction is employed for hinge 73 (FIGS. 6–8) and for the two bottom flange corner hinges 71 and 74.

The viewing shield assembly 40 is moved from its folded, closed condition, (FIG. 8) to its open condition (FIGS. 2 and 6) by lifting the top panel 44 and pushing the side panels 42 and 43 outwardly at their transverse hinges 52 and 53. In the open condition, the two side panel elements 42A and 42B are coplanar and the two side flange elements 62A and 62B are also coplanar. The same condition applies at the opposite side of the shield assembly; side panel elements 43A and 43B are coplanar and mounting flange elements 63A and 63B are coplanar. Under these circumstances, the upper and lower portions of hinge 92 are co-linear and the upper and lower portions of hinge 93 are co-linear, permitting both hinges to be rotated. Hinge leaf 104, in the course of the opening movement of the viewing shield assembly, rotates on flange 64 to position hinge 72 in the opened-out position illustrated in FIGS. 4, 5 and 6.

As the viewing shield 40 is opened, hinge 72 moves flange members 62 and 64 to their correct angular positions for mounting on the image frame of the television receiver 20 (FIG. 2). Flange member 62 is now out of coplanar relationship with side panel 42, being positioned at the appropriate angle *c* (FIG. 2) for mounting on the image exhibiting apparatus. The same action takes place at the other corner hinges 71, 73 and 74, so that all of the mounting flanges are aligned at the correct angles for mounting on the image exhibiting apparatus. As previously described, viewing shield 40 can now be mounted on and attached to the image exhibiting apparatus 20 with the side flanges 62 and 63 held out of coplanar relationship with their associated side panels 42 and 43. The hinges 52 and 96 are not colinear and hence cannot be rotated, and this is equally true of the hinges 53 and 97. As a consequence, the upper side panel element 42A is held in coplanar relationship with the lower side panel element 42B and side panel elements 43A and 43B are also held in coplanar alignment. Likewise, the upper and lower flange elements 62A and 62B are maintained coplanar as are flange elements 63A and 63B, keeping shield 40 in its open condition.

To close the viewing shield assembly 40, it is removed from image exhibiting apparatus 20. The two side panels 42 and 43 are pushed inwardly along their transverse hinges 52 and 53, which are constructed so that they tend to fold the side panel portions inwardly. The assembly then folds readily to its closed condition, shown in FIG. 8; the initial stage in folding of the shield assembly being illustrated in FIG. 7. When side panels 42 and 43 are pushed inwardly, hinges 52 and 96 move into co-linear alignment and the same is true of hinges 53 and 97 (FIG. 7). The upper flange element 62A becomes coplanar with the upper panel element 42A and the lower flange and panel elements 62B and 42B comes into coplanar alignment. The same action occurs at the opposite side of the viewing assembly. Consequently, the viewing shield is folded to the flat, compact, closed condition illustrated in FIG. 8.

In closing the viewing shield 40, the movement of the upper flange element 62A into coplanar alignment with the upper side panel element 42A causes hinge leaf 104 to rotate on flange member 64 from the position shown in FIGS. 4 and 5 to the alternate end of the permitted range of movement defined by slot 108. In the closed condition of viewing shield 40 (FIG. 8), the corner hinge 72 encompasses the top flange member 64 and side flange element 62A (FIGS. 5A and 8), bringing the top flange member 64 into coplanar alignment with the top panel 44. Of course, it will be recognized that hinge 73 affords a corresponding operation at the conjunction of the opposite end of flange 64 with flange element 63A, and that hinges 71 and 74 function similarly with respect to the bottom flange 65 and the two side flange elements 62B and 63B.

Another usable hinge construction is illustrated in the detailed view of FIG. 9, in which the light shield components are shown in an intermediate position corresponding to that of FIG. 6. The hinge 72A illustrated in FIG. 9 includes two rigid leaves 112 and 114 mounted upon flange members 62 and 64 respectively by suitable means such as the rivets 115. The two hinge leaves 112 and 114 are interconnected by a strip or web of flexible material 116, such as a relatively heavy soft vinyl film. This flexible hinge arrangement will not position the flange members 62 and 64 at the appropriate angle for mounting on the image frame of the image-exhibiting apparatus but will allow the flange members to be moved manually or to position themselves on the image frame. However, the hinge 72A, like hinge 72, does allow sufficient lost-motion for the flange members to be moved to the desired aligned position on the image frame to afford complete conformity to the image frame and hence assure a light-tight connection between the light shield and the image exhibiting apparatus. By the same token, the hinge construction 72A permits the flange members to be moved into coplanar relationship with their related shield panels in the process of folding the light shield to its closed condition. In each of the described hinge constructions, the lost-motion connection in the hinge accommodates variations in angular alignment in two directions (e.g., angles *d* and *e*) in addition to the usual pivotal hinge movement.

As noted above, the side mounting flanges 62 and 63 of light shield 40 serve a dual purpose; they form an integral part of the mounting means for mounting the light shield on the television receiver or other image exhibiting apparatus and also afford a retaining means for holding the upper and lower elements of side panels 42 and 43 in coplanar relation when the light shield is in use. This is the preferred construction for the light shield of the present invention, and is used whenever possible. However, other techniques may be adopted to maintain the upper and lower elements of each side panel in coplanar relationship when the light shield is opened out to its operating condition.

Figures 10, 11, 12:
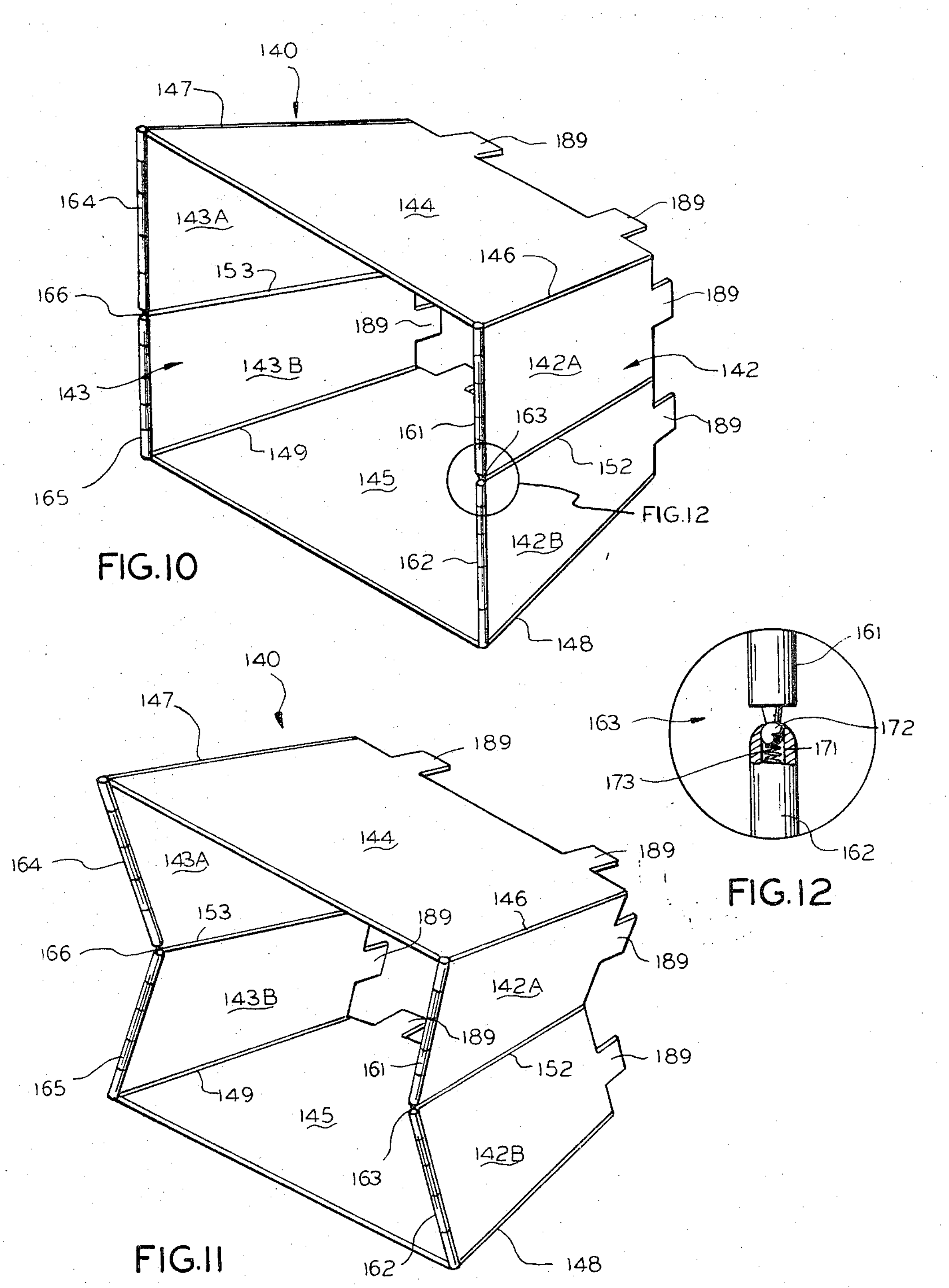
FIG. 10 is a perspective view of another form of the light shield.
FIG. 11 is a perspective view illustrating an initial stage in folding of the viewing shield of FIG. 10.
FIG. 12 is a detail view of the connector arrangement of the shield of FIG. 10.

One simple expedient of this type, which may be used in a light shield that does not employ mounting flanges, is illustrated in FIGS. 10 and 11 in a simplified viewing shield 140. The viewing shield 140 has no mounting flanges; it is employed for direct mounting on an image exhibiting apparatus without flanges.

The viewing shield 140 comprises two side panels 142 and 143 connected to a top panel 144 and a bottom panel 145 by a series of elongated hinges 146 through 149. The side panel 142 includes upper and lower panel elements 142A and 142B connected by an elongated transverse hinge 152; the side panel 143 is made up of an upper panel element 143A joined to a lower panel element 143B by a transverse hinge 153. The rear edges of the shield panels may afford a series of mounting tabs 189 for mounting the viewing shield 140 on an image-exhibiting apparatus, using appropriate clamps or other retains on the cabinet of the image-exhibiting apparatus (not shown). Other suitable mounting means may be employed as desired.

In the viewing shield 140, the retaining means for holding panels 142 and 143 flat when the shield is open comprise a first rigid post 161 affixed to the front edge of the upper panel element 142A and a second similar rigid post 162 affixed to the front edge of the lower panel element 142A. Posts 161 and 16a are interconnected by a ball joint connector 163. On panel 143, two rigid posts 164 and 165 are mounted on panel elements 143A and 143B, respectively, the adjacent ends of posts 164 and 165 being jpined by a ball joint connector 166.

The ball joint connector 163 is shown in detail in FIG. 12; the other ball joint connector 166 is similar in construction. As shown in FIG. 12, the upper end of post 162 terminates in a slotted socket 171 that receives a ball element 172 mounted on the end of post 161. A spring 173 is mounted in a recess that constitutes an extension of socket 171, affording a limiting frictional drag on rotational movement of the ball 172 in the socket 171.

When shield 140 is in its open condition, as illustrated in FIG. 10, the ball joint connector 163 holds posts 161 and 162 in the position shown in FIG. 12. Spring 173 resists rotation of ball 171, holding posts 161 and 162 in alignment and thus maintaining the front edges of side panel elements 142A and 142A colinear. The engagement of the rear end of side panel 142 with an image-exhibiting apparatus tends to hold the rear edges of the side panel elements in alignment. Thus, the side panel 142 is maintained coplanar. In the same way, the ball joint connector 166 affords a retaining means that holds the side panel 143 flat when the viewing shield 140 is in its open condition.

To fold the viewing shield 140 to a compact closed condition, the viewing shield is first removed from the image-exhibiting apparatus. This releases the rear edges of the side panels 142 and 143 and permits the side panels to fold along their respective hinges 152 and 153. It is then a simple matter to push the front edges of the side panels inwardly at the ball joints 163 and 166, in the manner shown in FIG. 11, to start the folding of the side panels and thus begin the movement of shield assembly 140 toward a compact, fully folded closed condition. The frictional drag of the ball joint connectors 163 and 166 affords an adequate retaining means to hold the light shield assembly 140 open in normal use, but does not prevent folding of the light shield assembly when this is desired.

In the foregoing description, the viewing shield of the invention has been described on the assumption that the vertical shield panels are split and hinged transversely to afford the requisite inward folding action to achieve the storage condition (FIG. 8). This is the preferred arrangement, since it precludes any substantial tendency toward sagging of the top and bottom panels. However, the shield orientation could be rotated ninety degrees, with the "side panels" positioned above and below the image display device, if desired. Moreover, the side panels can be folded outwardly, rather than inwardly, in the closed condition, affording a flatter but wider closed form.

The viewing shields of the present invention, as described herein, provide for highly satisfactory viewing under adversely bright ambient lighting conditions. They are sturdier than previously known light shields and can be manufactured more economically. The entire viewing shield assembly can be readily manufactured of low cost plastic materials by conventional manufacturing processes, the recommended material being a polyolefin plastic, preferably polyalomer or polypropylene. The plastic sheet can be die cut, punched and scored in conventional manner and the assembly may then be completed by riveting and stapling. The complete shield may also be fabricated or reinforced vinyl material with the hinges formed of the vinyl stock without reinforcement and with joints formed by the vinyl sealing process.

The viewing shields of the invention open out readily to operative condition and can be quickly and easily folded to a flat, compact storage condition. There are no loose pieces for the shields; there is nothing to add and no portions to attach together.

I claim:

1. A viewing shield for a television receiver, slide viewer, oscilloscope, or like image-exhibiting apparatus of the kind comprising an image-display member disposed within an encompassing image frame, said shield comprising:

four shield panels hingedly connected to each other along adjacent edges in a closed sequence to form a unitary shield assembly, the four shield panels including a top panel and a bottom panel joined by first and second opposed side panels, each side panel comprising an upper panel element and a lower panel element joined together by a transverse side panel hinge extending the full length of the side panel from a back edge to a front edge;

said assembly having an open condition in which the upper and lower elements of each side panel are disposed in coplanar relation and the back edges of all panels correspond approximately to the configuration of said image frame, said assembly further having a closed condition in which the upper and lower elements of each side panel are folded against each other, the entire assembly being folded in a flat, compact alignment approximately as thick as the total thickness of all four panels;

and retaining means for holding the upper and lower elements of each side panel in coplanar relation when said assembly is in its open condition.

2. A viewing shield for an image-exhibiting apparatus, according to claim 1, and further comprising releasable mounting means for mounting said assembly, in its open condition, on said image display member frame with no light entry opening at the area of attachment.

3. A viewing shield for an image-exhibiting apparatus, according to claim 1, in which the shield panels form a truncated pyramid when the shield assembly is in its open condition, the back edges of the shield panels constituting the small base of the truncated pyramid and the front edges constituting the large base.

4. A viewing shield for an image-exhibiting apparatus, according to claim 2, in which said retaining means comprises:

first and second side flange members hingedly mounted on the back edges of said first and second side panels, respectively, each side flange member including an upper flange element extending along the associated upper side panel element and a lower flange element extending along the associated lower flange element, with the upper and lower flange elements joined together by a transverse flange hinge aligned with the corresponding transverse side panel hinge;

the first flange member and first side panel each preventing folding of the other along its transverse hinge, and maintaining the elements of the other in coplanar relation, whenever the first flange member and first side panel are angularly displaced from each other in the open condition of the viewing shield so that their respective transverse hinges are non-colinear, thereby preventing rotation of the transverse hinges, and the second flange member and second side panel each preventing folding of the other along its transverse hinge, and maintaining the elements of the other in coplanar relationship, whenever the second flange member and the second side panel are angularly displaced from each other in the open condition of the viewing shield so that their respective transverse hinges are non-colinear, thereby preventing rotation of the transverse hinges.

5. A viewing shield for an image-exhibiting apparatus, according to claim 4, in which said side flanges comprise a part of said mounting means, and in which said side flange members each engage said image frame at an angle precluding coplanar alignment of the side flange member with its associated side panel.

6. A viewing shield for an image-exhibiting apparatus, according to claim 5, and further comprising:

a top flange member hingedly mounted on the back edge of the top panel;

and first and second corner hinges connecting the opposite ends of said top flange member to the top ends of said first and second side flange members, respectively, said corner hinges each including a lost-motion connection accommodating the changes in angular alignment of said top flange member relative to the associated side flange member, in two different directions, occurring during movement of the viewing shield assembly between its open and closed conditions.

7. A viewing shield for an image-exhibiting apparatus, according to claim 6, in which each corner hinge connecting said top flange member to a side flange member comprises:

a first hinge leaf rigidly attached to one of said top and side flange members; and a second hinge leaf pivotally connected to said first hinge leaf;

said lost-motion connection comprising a pin-and-slot connection from said second hinge leaf to the other of said flange members, to afford limited, controlled pivotal movement of said second hinge leaf relative to said other flange member during movement of the viewing shield assembly between its open and closed conditions.

8. A viewing shield for an image-exhibiting apparatus, according to claim 7, in which said corner hinges are so attached to said top and side flanges that in the open condition of the viewing shield, said top and side flanges are held at the correct angle for mounting to said encompassing image frame in a light-tight attachment, and in which said pin-and-slot connection from said second hinge leaf to the other said flange member results in pivotal movement of said second hinge leaf relative to said other flange member when said viewing shield is moved to its closed condition, said pivotal movement of said second hinge leaf repositioning said corner hinge and permitting said side flanges and said top flange to move to coplanar position with their attached side and top panels in said closed condition of said viewing shield.

9. A viewing shield for an image-exhibiting apparatus, according to claim 6, in which each corner hinge connecting said top flange member to a side flange member comprises:

first and second hinge leaves, each rigidly secured to one of said flange members;

and a flexible, twistable web, interconnecting said hinge leaves and affording said lost-motion connection.

10. A viewing shield for an image-exhibiting apparatus, according to claim 1, in which said retaining means for each side panel comprises:

a first rigid post affixed to the front edge of said upper panel element;

a second rigid post affixed to the front edge of said lower panel element;

and a ball joint connector, connecting the adjacent ends of said posts, said ball joint connector holding said side panel flat when said viewing shield is in its open condition but permitting folding of said viewing shield to its closed condition.

* * * * *